US006857120B1

(12) United States Patent
Arnold et al.

(10) Patent No.: US 6,857,120 B1
(45) Date of Patent: Feb. 15, 2005

(54) METHOD FOR CHARACTERIZING PROGRAM EXECUTION BY PERIODIC CALL STACK INSPECTION

(75) Inventors: Matthew R. Arnold, Ridgefield Park, NJ (US); Stephen J. Fink, Yorktown Heights, NY (US); David P. Grove, Ridgefield, CT (US); Michael J. Hind, Cortlandt Manor, NY (US); Peter F. Sweeney, Spring Valley, NY (US); John Whaley, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 09/703,530

(22) Filed: Nov. 1, 2000

(Under 37 CFR 1.47)

(51) Int. Cl.$^7$ ................................. G06F 9/45
(52) U.S. Cl. ................. 717/157; 717/127; 717/131; 717/133; 717/153
(58) Field of Search ................ 717/127, 131, 717/133, 153, 157

(56) References Cited

U.S. PATENT DOCUMENTS

| | | | | |
|---|---|---|---|---|
| 5,161,216 A | * | 11/1992 | Reps et al. | 717/151 |
| 5,212,794 A | * | 5/1993 | Pettis et al. | 717/153 |
| 5,812,855 A | * | 9/1998 | Hiranandani et al. | 717/157 |
| 5,828,883 A | * | 10/1998 | Hall | 717/133 |
| 5,995,754 A | | 11/1999 | Hölzle et al. | |
| 6,079,032 A | * | 6/2000 | Peri | 714/38 |
| 6,381,735 B1 | * | 4/2002 | Hunt | 717/158 |

OTHER PUBLICATIONS

Horwitz, Susan, Reps, Thomas, Binkley, David, "Interprocedural Slicing Using Dependence Graphs", p. 35–46, Jun. 1988, retrieved from ACM Portal database Nov. 10, 2003.*

Reiss, Steven P., Renieris, Manos, "Generating Java Trace Data", p. 71–77, Jun. 2000, retreived from ACM Portal Database Nov. 10, 2003.*

Whaley, John, "A Portable Sampling–Based Profiler for Java Virtual Machines", p. 78–87, Jun. 2000, retrieved from ACM Porta Database, Nov. 10, 2003.*

"Profile–Guided Receiver Class Prediction", by David Grove, et al., 1995 ACM 0–89791–703–0/95/0010, pp. 108–123.

"Adaptive Systems for the Drynamic RN–Time Optimization of Programs", Gilbert J. Hansen, National Technical Information Service, Mar. 1974, AD784880.

"System Support for Automatic Profiling and Optimization", by Xiaolan Zhang, et al., Division of Engineering and Applied Sciences, Harvard University, pp. 15–26.

"Digital FX!32: Combining Emulation and Binary Translation", by Raymond J. Hookway, et al., Digital Technical Journal, vol. 9, No. 1, 1997, pp. 2–13.

"Transparent Dynamic Optimization; The Design and Implementation of Dynamo" by Vasanth Bala, et al., Hewlett Packard, 1999, pp. 2–102.

(List continued on next page.)

*Primary Examiner*—Tuan Dam
*Assistant Examiner*—Mary Steelman
(74) *Attorney, Agent, or Firm*—Scully, Scott, Murphy & Presser; Richard M. Ludwin, Esq.

(57) ABSTRACT

A method for characterizing runtime behavior of a computer program executing in an execution environment comprising: generating a call stack runtime data structure for tracking methods currently active in an executing program thread, an active method on the call stack is represented by a frame; determining condition for sampling an executing program to determine current program behavior; and, upon determination of a sampling condition, the sampling including examining at least one frame in the call stack in response to evaluate context of one or more methods represented in the call stack, the at least one frame in the call stack providing context relating to an executing program's calling structure.

36 Claims, 4 Drawing Sheets

OTHER PUBLICATIONS

"A General Approach for Run–Time Specialization and its Application to C", by Charles Consel, et al., 1996 ACM 0-89791-769-3/9/01, pp. 145–156.

"Reconciling Responsiveness with Performance in Pure Object–Oriented Languages", by Urs Hölzle, et al, ACM Transactions on Programming Languages and Systems, vol. 18, No. 4, Jul. 1996, pp. 355–400.

"tcc: A System for Fast, Flexible, and High–level Dynamic Code Generation", by Massimiliano Poletto, et al., 1997 ACM 0-89791-907-6/97/0006, pp. 109–121.

Profile–guided Automatic Inline Expansion for C Programs, by Pohua P. Chang, et al., Software–Practice and Experience, vol. 22(5), May 1992, pp. 349–369.

"Fast, Effective Dynamic Compilation", by Joel Auslander, et al., 1996 ACM 0-89791-795-2/96/0005, pp. 149–159.

"Exploiting Hardware Performance Counters with Flow and Context Sensitive Profiling", by Glenn Ammons, et al., 1997 ACM 0-89791-907-6/97/0006, pp. 85–96.

"Continuous Program of Optimization", by Thomas P. Kistler, University of California at Irvine, 1999, pp. 5–151.

"Efficient Compilation and Profile–Driven Dynamic Recompilation in Scheme", by Robert G. Burger, Indiana University, Mar. 1997, pp. ii–xi and 1–91.

"An Infrastructure for Profile–Driven Dynamic Recompilation", by Robert G. Burger, et al., Computer Science Department, Indiana University, pp. 1–10.

"Effcient Incremental Run–Time Specialization for Free", by Renaud Marlet, et al., University of Rennes, by, pp. 281–292.

"Optimizing ML with Run–Time Code Generation", by Peter Lee, et al., School of Computer Science, 1996 ACM 0-89791-795-2/96/0005, pp. 137–148.

"Continuous Profiling: Where Have All the Cycles Gone?", by Jennifer M. Anderson, et al., SRC Technical Note, 1997–016a, pp. 1–20.

"Implementing Jalapeño in Java", by Bowen Alpern, et al., 1999 ACM 1-58113-238-7/99/0010, pp. 314–325.

"An Evaluation of Staged Run–Time Optimizations in DyC", by Brian Grant, et al., Department of Computer Science and Engineering, University of Washington, pp. 293–304.

"The Jalapeño virtual machine", by B. Alpern, IBM Systems Journal, vol. 39, No. 1, 2000, pp. 211–238.

\* cited by examiner

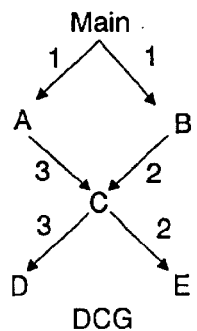 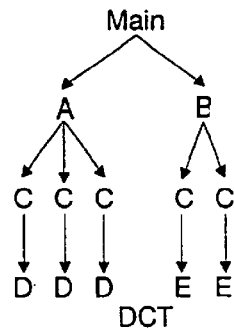 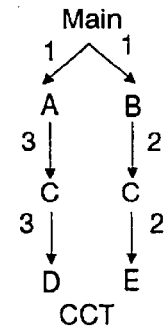
FIG. 1(a)  FIG. 1(b)  FIG. 1(c)
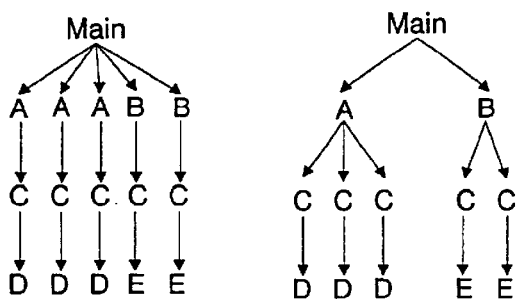
FIG. 2

METHOD FOR CHARACTERIZING PROGRAM EXECUTION BY PERIODIC CALL STACK INSPECTION

BACKGROUND OF THE INVENTION

1. Field of the Invention

This invention relates generally to computer program execution systems, e.g., optimizing compilers, and more specifically, to a sampling-based method and data structures for characterizing a program's execution by periodic call stack inspection during runtime.

2. Discussion of the Prior Art

Many modern programming language runtime environments and tools can benefit from runtime feedback from a program. For example, Java Virtual Machines (JVM) may use runtime feedback to guide optimization of the running program. As another example, program understanding tools may gather runtime information and report summaries to the user. An adaptive optimization system attempts to optimize an executing program based on its current execution. Such systems typically identify sections of the program where significant runtime is spent and recompiles those sections with an optimizing compiler.

Thus, a number of research projects have explored more aggressive forms of dynamic compilation: These projects have been described in the following references: "Fast, effective dynamic compilation", Proceedings of the ACM SIGPLAN '96 Conference on Programming Language Design and Implementation, pages 149—159, Philadelphia, Pa., 21–24 May 1996, and SIGPLAN Notices, 31(5), May 1996 to J. Auslander, et al.; "Dynamo: A transparent dynamic optimization system", SIGPLAN 2000 Conference on Programming Language Design and Implementation, June 2000 to V. Bala, et al.; "Efficient Compilation and Profile-Driven Dynamic Recompilation in Scheme", PhD thesis, Indiana University, 1997 to R. G. Burger; "An infrastructure for profile-driven dynamic recompilation", ICCL'98, the IEEE Computer Society International Conference on Computer Languages, May 1998, to R. G. Burger et al.; "A general approach for run-time specialization and its application to C", Conference Record of the 23rd ACM SIGPLAN-SIGACT Symposium on Principles of Programming Languages}, pages 145–156, January 1996 by C. Consel et al.; "DyC: An expressive annotation-directed dynamic compiler for C", Technical Report TR-97-03-03, University of Washington, Department of Computer Science and Engineering, March 1997 by B. Grant, et al.; "An evaluation of staged run-time optimizations in DyC", Proceedings of the ACM SIGPLAN'99 Conference on Programming Language Design and Implementation, pages 293–304, 1999 by B. Grant, et al.; "Continuous Program Optimization", PhD thesis, University of California, Irvine, 1999 by T. P. Kistler; "Dynamic specialization in the Fabius system", ACM Computing Surveys, 30(3es):1–5, Sep. 1998, Article 23 by M. Leone et al.; "Efficient incremental run-time specialization for free", Proceedings of the ACM SIGPLAN '99 Conference on Programming Language Design and Implementation, pages 281—292, 1999, by R. Marlet, et al.; and, "A system for fast, flexible, and high-level dynamic code generation", Proceedings of the ACM SIGPLAN'97 Conference on Programming Language Design and Implementation (PLDI), pages 109–121, Las Vegas, Nev., 15–18 Jun. 1997, and SIGPLAN Notices 32(5), May 1997, by M. Poletto, et al. These aggressive forms of dynamic compilation use runtime information to tailor the executable to its current environment. Most of these systems are not fully automatic, and so far, few of these techniques have appeared in mainstream JVMs. However, these systems have demonstrated that online feedback-directed optimizations can yield substantial performance improvements.

Previous work, such as the Self-93 system is described in aforementioned "Reconciling responsiveness with performance in pure object-oriented languages", ACM Transactions on Programming Languages and Systems, 18(4): 355–400, July 1996 to Hölzle, et al. In the Self-93 work the call stack is examined when an invocation counter threshold is reached with the goal of determining which active method on the call stack is a likely candidate to be compiled. The method to be compiled is chosen using parameterizable heuristics, such as the size of a method. Thus, in the Self-93 system, the methods that are on the call stack are neither recorded nor used to determine the runtime behavior of an application.

It would be highly desirable to provide a novel system and method for examining the call stack of a running application and gathering information as the stack is traversed which can be used to determine the runtime behavior of an application.

It would be further highly desirable to provide a novel system and method for examining the call stack of a running application having low overhead for driving adaptive and online feedback-directed optimizations.

SUMMARY OF THE INVENTION

It is an object of the present invention to provide a system and method for determining the runtime behavior of an application by traversing the program call stack and examining the information on the call stack of the running application to determine runtime execution behavior of the application.

It is a further object of the present invention to provide a novel system and method for examining the call stack of a running application that has low overhead.

According to the invention, there is provided a system and method for characterizing runtime behavior of a computer program executing in an execution environment comprising steps of: generating a call stack runtime data structure for tracking methods currently active in an executing program thread, an active method on the call stack is represented by a frame; determining a condition for sampling an executing program to determine current program behavior; and, upon determination of a sampling condition, the sampling includes examining at least one frame in the call stack in response to evaluate the context of one or more methods represented in the call stack, the at least one frame in the call stack provides the context that relates to an executing program's calling structure.

The examining step further includes the step of obtaining a pointer to a stack frame in that specific executing program thread and following previous stack pointers for traversing a path comprising a sequence of stack frames in the call stack. More program context is ascertained as more stack frames are traversed to identify a new sampled path.

Advantageously, such a system and method is general enough to be applied to a compiler and interpreter during a program's execution.

BRIEF DESCRIPTION OF THE DRAWINGS

Further features, aspects and advantages of the apparatus and methods of the present invention will become better understood with regard to the following description, appended claims, and accompanying drawings where:

FIGS. 1(a)–1(c) illustrate example dynamic call graph (DCG), the dynamic call tree (DCT), and the calling context tree (CCT) representing the execution of an example program.

FIG. 2 depicts two dynamic call trees (DCT's) that are represented by the same calling context tree (CCT) presented in FIG. 1(c).

DETAILED DESCRIPTION OF THE PREFERRED EMBODIMENTS

Figures 3A, 3B, 3C, 3D:
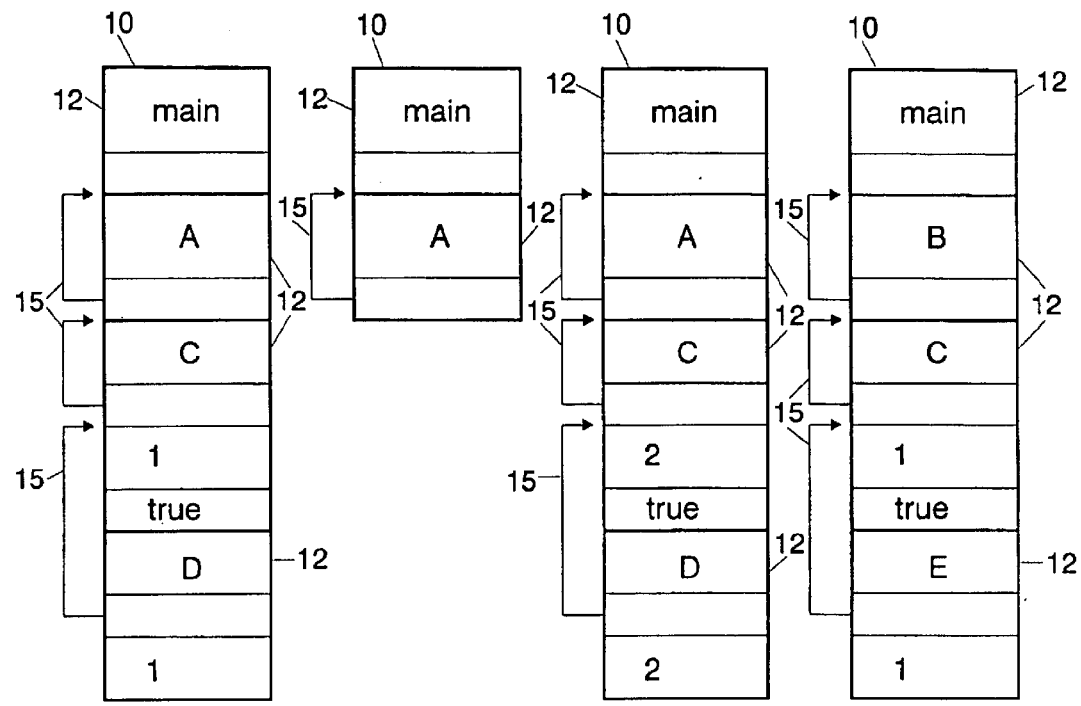
FIGS. 3(a)–3(d) illustrate four call stacks that correspond to four different points of the execution according to the example program.

For exemplary purposes, the present invention is described for operation in a particular Java Virtual Machine (JVM) targeting server applications that implement a "compile-only" strategy by compiling all methods to native code before they execute, such as described in the references "Jalapeno Virtual Machine", IBM Systems Journal, 39(1), 2000 by B. Alpern, C. R. Attanasio, et al and "Implementing Jalapeno in Java", ACM Conference on Object-Oriented Programming Systems, Languages, and Applications, 1999, both of which are incorporated by reference as if fully set forth herein. However, it is understood that the principles of the invention as described herein may be applicable to any run-time environment, e.g., Virtual Machines, interpreters, Just-in-Time compilers, etc.

In general, a program may have multiple calling structures for representing different executions of a program. For example, if the program's behavior is dependent on its input, then for different inputs, different calling structures may evolve. According to the principles of the invention, there are defined principle data structures that represent calling relationships among the program's methods. The data structures are the dynamic call graph (DCG), the dynamic call tree (DCT), the calling context tree (CCT), and the call stack (CS).

An example program is used with reference to FIGS. 1(a)–1(c) to illustratively depict these data structures. In this program, main calls method A and then calls method B. Both A and B call method C, passing C two arguments: 1) a boolean which indicates whether C is called from either A or B; and, 2) an integer which indicates the number of times C is called from either A or B. If C is called from A, C calls method D, otherwise, it calls E. Method C passes an integer to both D and E indicating the number of times C has called them.

```
begin
main( ) {
    A( );
    B( );
}
A( ) {
    for (int i=1; i<=3; i++) {
        C(true, i);
    }
}
B( ) {
    for (int i=1; i<=2; i++) {
        C(false, i);
    }
}
C(boolean b, int i) {
    if (b) {
        D(i);
    } else {
        E(i);
    }
}
D(int i) {
    // do something
}
E(int i) {
    // do something
}
end
```

FIGS. 1(a)–1(c) illustrate the respective dynamic call graph (DCG), the dynamic call tree (DCT), and the calling context tree (CCT) data structures that capture the calling structure of the example program's execution. In each of these graphs, a node represents a method and an edge represents a call from one method to another. It should be understood that the implementation of these data structures may additionally distinguish between call sites. Therefore, if method A called method B from two different program points in A, the calls would be distinguished by the different program points. For purposes of explanation, call sites are not modeled in any of the graphical representations of a program's execution.

The DCG is a graph, where nodes represent methods and edges represent call sites and their target. Since object-oriented languages support polymorphic calls, a call site may have multiple targets. Each target at a call site is identified by a call graph edge. Thus, in the DCG of FIG. 1(a) relating to the example program, the nodes labeled C and D represent the methods C and D respectively, and the edge from the node C to node D represents the call from method C to D. A path through one of these graphs represents a calling context. For example, the path in the DCG from main to A to C to D, denoted in a tuple notation as <main, A, C, D> represents the call to D from C, when C is called from A and A is called from main. A partial call graph (PCG) is additionally defines as a subgraph of a call graph; that is, the PCG is a graph that contains a subset of the nodes and edges that are in a call graph.

Each graph makes a tradeoff between space and precision, which corresponds to the level of detail about the program's execution that is captured. For example, the DCG requires the least amount of space, but sacrifices preciseness. In a DCG, there is at most one node for each method in the program. This results in the fact that a DCG may contain a path, representative of a calling context, that may never occur in the program's execution. For example, the path <main, A, C, E> may never occur in the execution of the example program because whenever A calls C, C calls D, not E.

Unlike the DCG, the DCT illustrated in FIG. 1(b) has a node for each time a method is invoked, and an edge between a pair of nodes for each time a call between the corresponding method's in the program occurs in the program's execution. In particular, this data structure captures the order in which methods are invoked.

The CCT is a rooted tree of call graph paths, such that any path is only represented once. Paths with common prefixes may share the corresponding nodes and edges in the CCT. Thus, unlike the DCG of FIG. 1(a), and like a DCT, the CCT may have many nodes that represent a method, one node for each calling context in which that method is invoked. But unlike the DCT, a node in the CCT may represent multiple invocations of the corresponding method. In addition, a CCT also makes a trade off between space and precision by not capturing the order in which methods are invoked. There are many dynamic call trees that would be represented by the CCT in FIG. 1(c). Consider the two DCT's in FIG. 2. Each of these DCT's is represented by the CCT in FIG. 1(c) because a CCT does not take into account the order in which method invocations occur.

The DCG and CCT data structures above may have a weight associated with each edge (or each node), representing the execution frequency of that edge (or that node). That is, since an edge in the DCG and CCT may represent multiple calls, an edge in these graphs may be annotated with a number indicating the number of calls that edge represents. For example, the edge from A to C is labeled with the number 3 representing that method A calls method C three times in the example program.

A call stack, CS, is a thread-specific runtime data structure that keeps track of the methods that are currently active in that thread. Each active method is represented by a frame in the call stack. In this description, it is assumed that the stack grows in a downward fashion, i.e., the most recent stack frame for newly called methods is at the bottom of the stack and least recent frame is at the top. In operation, for example, if a method A calls method B which calls method C, the call stack before C returns will contain (from top to bottom) a stack frame for A, a stack frame for B, and a stack frame for C. Each stack frame (also referred to as an activation record) includes three pieces of information: the name of the method whose execution this stack frame represents; a pointer to the stack frame of the calling method; and, the values of the arguments that are passed. It is understood that other information may be maintained in a stack frame, including, for example, the return address of the calling method, i.e., an instruction in the calling method that occurs after the branch to the callee. In the example above, the stack frame for C would have a stack frame pointer to B's frame, and B would have a stack frame pointer to A's frame. Most processors have a dedicated stack frame register which points to the last stack frame that was created. In the example described above, the stack frame register would be pointing to the stack frame for method C, when execution is in C.

When a program executes, the runtime environment models the program's execution with the call stack CS which keeps track of the methods that have been invoked and are still running by modeling an active method as a stack frame. For example, the call stack would represent the invocation of method D as: a stack frame for main, one for A, one for C, and finally one for D.

When D is called, methods main, A, and C have been invoked and are waiting for D to finish executing. The graphical representation of the call stack for D is illustrated in FIG. 3(a).

Specifically, FIGS. 3(a)–3(d) illustrate four call stacks 10 that correspond to different points in the execution of the example program. In each call stack 10, a stack frame 12 is demarcated by a thickly lined box that is labeled by the method it represents; followed by the pointer 15 to the stack frame of the calling method; followed by the values of arguments (if any) that were passed to the corresponding method. The call stack 10 illustrated in FIG. 3(a) represents the first invocation of D. Notice that the i parameters to both C and D have the value of 1. The call stack illustrated in FIG. 3(b) is intended to represent the program's execution after the invocations to C and D have finished executing. It should be noted that, without other program state, this call stack could also represent the program's execution before the first invocation of C. When method D finishes executing, its stack frame is popped off of that call stack, and C, whose stack frame is now on the bottom of the call stack, continues executing at the program point just after the call to D. When method C finishes executing, its stack frame is popped off of that call stack, and A, whose stack frame is now on the bottom of the call stack, continues executing at the program point just after the call to C.

The call stack illustrated in FIG. 3(c) represents the second invocation of D. Notice that the i parameters to both C and D have the value 2. Finally, the call stack illustrated in FIG. 3(d) represents the first call to C from B, and the first call to E in this calling context.

It is understood that each thread may have its own local data structure or a data structure may be shared between all or a subset of the threads.

In accordance with the preferred embodiment of the invention, when a sample is taken, the CS is traversed by starting at the last stack frame that was created (using the stack frame register) and then following stack frame pointers 15. The number of frames examined determines the amount of context that may be recorded. When sampling is software based, using the program counter to determine the method that is currently active at sample time will result in the method taking the sample always being sampled. Therefore, traversing the call stack provides a mechanism to identify the application method that was active when the sample was taken.

Determining only the method that is currently executing when the sample occurs gives the least amount of context. Examining additional stack frames by "walking up" the call stack 10 provides more context. For example, the first two stack frames that are not involved in taking the sample may be used to compute an edge in the call graph. The first identified stack frame corresponds to the called method, this stack frame's return address is the call site, and the next identified stack frame corresponds to the caller method. This triple identifies an edge in the application's call graph. A PCG is thus easily constructed whenever an edge in the application's call graph is sampled. If the edge is not represented in the PCG, the edge is added and its weight is set to one. Otherwise, the weight of the corresponding edge in the PCG is incremented.

By examining additional stack frames, a path may be identified in the call graph. Each such path represents a calling context in which the method on the bottom of the call stack is called. In this case, the context is not a single edge, but a path of edges from callers to callees.

There are presented the two construction algorithms, exhaustive and partial, that may be used to construct a CCT.

Exhaustive Construction of a Calling Context Tree

A technique for exhaustive construction of a CCT is described in a reference to G. Ammons, T. Ball, and J. R.

Larus entitled "Exploiting hardware performance counters with flow and context sensitive profiling, Proceedings of the ACM SIGPLAN'97 Conference on Programming Language Design and Implementation (PLDI), pages 85—96, Las Vegas, Nev., 15—18 Jun. 1997. SIGPLAN Notices 32(5), May 1997. An exhaustive construction algorithm (ECA) constructs a CCT by performing updates to the CCT on all method entries and exits. The CCT data structure maintains a pointer P to the node $CCT(M_1)$ that represents the last method, $M_1$, that was called. It is understood that P is thread specific. During the execution of $M_1$, $M_1$ either calls another method or returns to its caller. If it returns to its caller, P is adjusted to point to the $CCT(M_1)$'s parent. If $M_1$ calls another method, $M_2$, at call site s, then either M, has called $M_2$ in this calling context previously or this is the first time. If $M_2$ was previously called from $M_1$ in this calling context, then P is adjusted to point to the existing node, $CCT(M_2^{old})$ that corresponds to $M_2$ in this calling context. Note that there must be an edge from $CCT(M_1)$ to $CCT(M_2^{old})$. The counter associated with the edge from $CCT(M_1)$ to $CCT(M_2^{old})$ is incremented. Otherwise, a new node, $CCT(M_2^{new})$, is created to represent $M_2$ in this calling context, an edge is added from $CCT(M_1)$ to $CCT(M_2^{new})$ at call site s, and P is updated to point to $CCT(M_2^{new})$. The counter associated with the edge from $CCT(M_1)$ to $CCT(M_2^{new})$ is set to one.

Figures 4A, 4B, 4C, 4D:
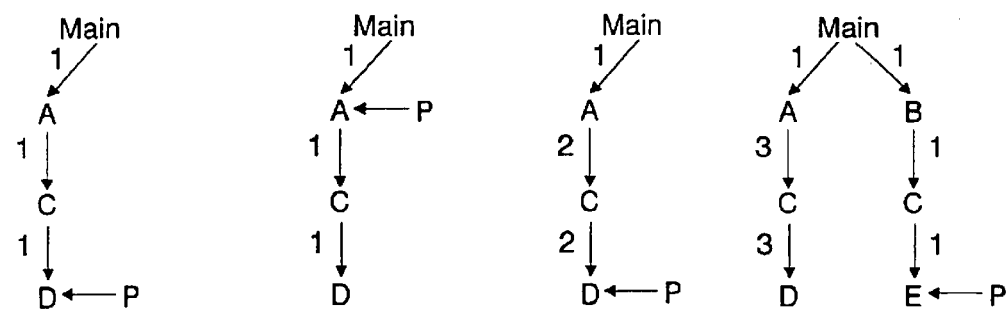
FIGS. 4(a)–4(d) illustrate how the Exhaustive Construction Algorithm has created the CCT for different execution points of the example program and corresponding to the call stack representations of execution points illustrated in FIGS. 3(a)–3(d) respectively.

FIGS. 4(a)–4(d) illustrate how the ECA has created the CCT for different execution points of the example program where the corresponding call stack representation of these execution points are illustrated in FIGS. 3(a)–3(d). FIG. 4(a) illustrates the state of the CCT when D is called for the first time: P points to the node D in the CCT and the values of all of the edges are 1. FIG. 4(b) illustrates the state of the CCT when the first invocation of D and C have finished: P points to the node A in the CCT. Notice that the C and D nodes are retained, and the edges coming into these nodes are retained as are their values. Unlike the call stack, the CCT has no ambiguity about the program state because the execution history is kept. FIG. 4(c) illustrates the state of the CCT when D is called for the second time from A: P points to the node D in the CCT and the values of the edges from A to C and from C to D have been incremented to 2. Notice that both nodes C and D are reused as they represent a calling contexts that occurred previously.

FIG. 4(d) illustrates the state of the CCT when E is called for the first time from C: P points to the node E in the CCT and the values of the edges from B to C and from C to E are 1. Notice that a new node labeled C has been added to the CCT. The previous node labeled C can not be reused because it represents a different calling context; that is, it was called from method A.

Obviously, a CCT can be constructed whenever a stack frame is pushed onto or popped off of the call stack, because a push corresponds to a method entry and a pop corresponds to a method exit.

Partial Construction of a Calling Context Tree

The partial construction algorithm (PCA) of a CCT uses samples of the call stack to update the CCT. Unlike the ECA, PCA does not require an update after every entry to, or exit from, a method, but only when a sample is taken. When a sample operation occurs, three determinations are addressed: 1) a determination of how much of the call stack should be examined; 2) a determination of how the new sampled path is spliced into the CCT; and, 3) a determination of how the edge weights of the new sampled path are updated.

The first determination limits how many stack frames on the call stack must be examined. In each stack frame, a bit is added. This bit could be the low order bit of an address field, however, as addresses are on even boundaries, the low order bit may not be used by the address but may be used as a flag. The bit is used to determine how much of the call stack should be examined when a sample occurs. The bit is initially OFF for each stack frame and is turned ON only if this stack frame is sampled. When the call stack is walked, if a stack frame has its bit ON then that stack frame is represented in the CCT from a previous sample and no additional stack frames need to be examined. Otherwise, the stack frame's bit is turned ON and the next stack frame is examined.

FIG. 5 illustrates instances of modified call stacks 100 where a bit 102 is added to the stack frame pointer of each stack frame to indicate if the stack frame has been sampled or not. In FIG. 5, the bit 102 is on when the box representing the bit contains an "x".

The second determination identifies where the new sampled path is spliced into the CCT. The CCT maintains a pointer, P, which points to the last CCT node that was updated. In the PCA, P points to the last method that was called when the last sample was taken. When a new sample is taken, the call stack is walked up starting at stack frame $SF_{last}$ until a stack frame is discovered that has its bit 102 turned ON. As the call stack is walked and a frame is found with its bit not turned on, its bit will be turned on. The first stack frame with its bit turned ON, from a previous call stack walk, is denoted as $SF_{ancestor}$. Since $SF_{ancestor}$ was sampled previously, there must be a corresponding node, CCT $(N_{ancestor})$, in the CCT and $CCT(N_{ancestor})$ must be an ancestor of $CCT(N_{last})$. $CCT(N_{ancestor})$ may be found by recursively following parent pointers in the CCT starting at $CCT(N_{last})$. From $SF_{ancestor}$ and its corresponding node, $CCT(N_{ancestor})$ in the CCT, the portion of the call stack that has just been walked may be spliced into the CCT by treating the CCT as a CCT where P is initially set to $CCT(N_{ancestor})$ and simulating a call for each stack frame that is encountered as the call stack is walked down from $SF_{ancestor}$. After the new sampled path is spliced into the CCT, P is updated to the node in the CCT that corresponds to $SF_{last}$.

Figures 5A, 5B, 5C, 5D:
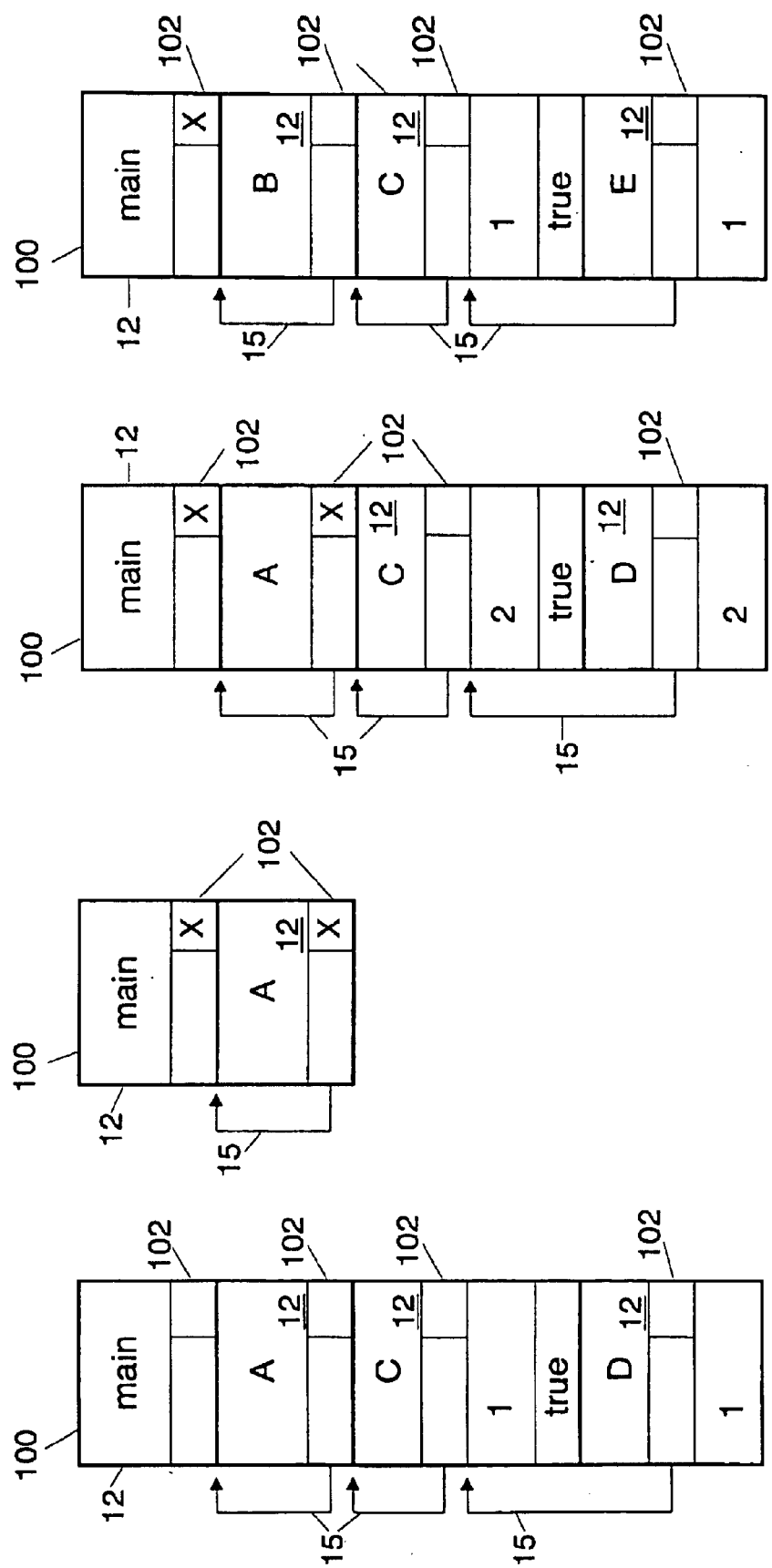
FIGS. 5(a)–5(d) illustrate the modified call stack where a bit is added to the stack frame pointer of each stack frame to permit the efficient, partial construction of the CCT.

An illustration of how the PCA works is now presented. Assume the last call stack sample left the CCT in the state illustrated in FIG. 4(c); that is, just after the second invocation to D. The PCA updates edge weights differently than the ECA. For the purposes of this discussion, ignore the edge weights. Assume the next call stack sample occurs after the first call to E; that is, FIG. 5(d) is the state of the call stack at this point in the program's execution. The construction algorithm works as follows: The call stack is walked up until the stack frame for main is found. This is the first stack frame with its bit on. main corresponds to $SF_{ancestor}$ in the partial construction algorithm of the invention. The CCT (main) node is found in the CCT by recursively following the parent points from the node CCT(D) that is pointed to by P. CCT (main) corresponds to $CCT(N_{ancestor})$ in the construction algorithm. Starting from $SF_{main}$ and CCT (main), the stack frames are spliced into the CCT as follows: Consider the first stack frame SF. Because CCT (main) has no child node that corresponds to method B, a new CCT node CCT(B) is added with an edge from CCT(main) to it. Consider the next stack frame $SF_c$. Because CCT(B) is a new node, it has no child. Therefore, a new node CCT(C) is added to the CCT with an edge from CCT(B). Consider the last stack frame SF. Because CCT(C) is a new node, it has no child. Therefore a new node CCT(E) is added to the CCT with an edge from CCT(C). P is updated to point to CCT(E).

Finally, the third determination is discussed; how the edge weights of the sampled path are updated. Several edge updating strategies are possible, one of which is to increment all edges along the newly sampled path. Another technique, which provides a more accurate approximation of a CCT, is to only increment the weight of the edge that represents the call which occurred immediately before the sample was taken. Alternately, weights could be associated with nodes, and the node corresponding to P would be incremented. The edge to be incremented is identified by the node that is pointed to by P and its parent. Since the CCT is a tree, an edge is uniquely identified by a node and its parent.

A variation of the first two determinations is now presented. The variation on the first technique limits the number of stack frames that are examined during a sample to some value k. Since $SF_{ancestor}$ may be at a stack frame greater than k, the sample path will not always have the corresponding node in the CCT at which the sample should be spliced.

The variation on the second determination identifies where the new sampled path is spliced into the CCT. Although there are multiple variations possible, three of them are herein described.

When a sample is taken, if a stack frame is not encountered with its bit turned on, then the sampled path is not spliced into the CCT, but is represented as a new root in the CCT. In this variation, the definition of a CCT is to be extended from a rooted tree of call graph paths to a forest of call graph paths. Let set $S_m$ correspond to all the nodes that represent the method m in the CCT. Assuming that the $k^{th}$ stack frame represents a call to m, the second approach is to pick any node in $S_m$ as $N_{ancestor}$. The third approach picks the node n in $S_m$ as $N_{ancestor}$ that has the longest subpath starting at n that is in common with the subpath starting at the $k^{th}$ stack frame in the sampled path.

Adaptive Optimization System

Commonly-owned, co-pending U.S. patent application Ser. No. 09/703,527 entitled A METHOD TO CHARACTERIZE PROGRAM BEHAVIOR BY SAMPLING AT SELECTED PROGRAM POINTS describes a sample-based system including a runtime measurement subsystem for sampling distinguished program points, i.e., those executing program points at which yield points have been inserted. This runtime measurement subsystem is part of a larger system described in greater detail in commonly-owned, co-pending U.S. patent application Ser. No. 09/703,316 entitled SYSTEM AND METHOD FOR ADAPTIVELY OPTIMIZING PROGRAM EXECUTION BY SAMPLING AT SELECTED PROGRAM POINTS, the contents and disclosure of which is incorporated by reference as if fully set forth herein.

Figure 6:
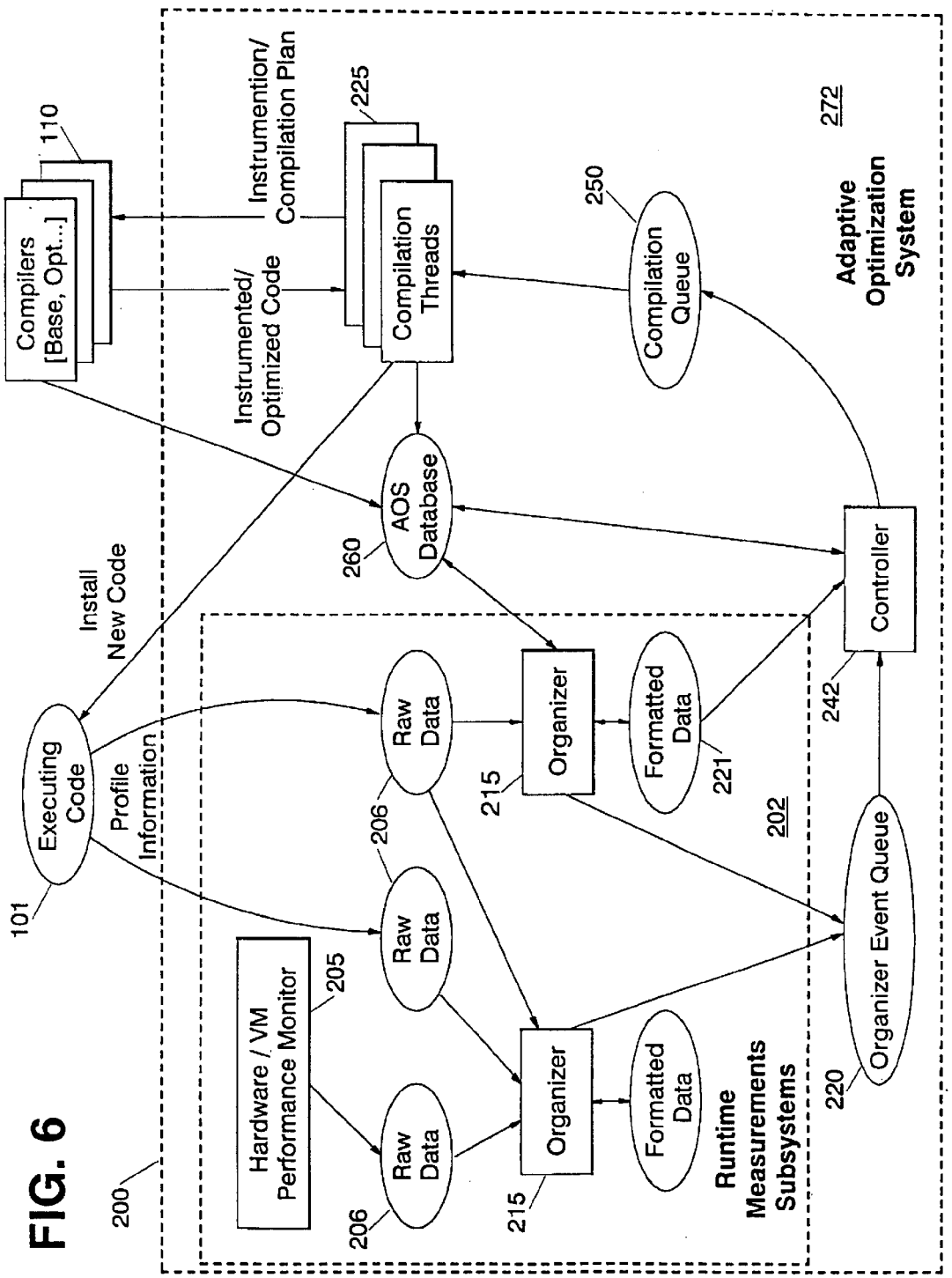
FIG. 6 depicts the internal structure of the JVM Adaptive Optimization System (AOS) 200 including the interactions between its subsystem components.

Generally, FIG. 6 depicts the internal structure of a JAVA Virtual Machine (JVM) Adaptive Optimization System (hereinafter "AOS") 200 described in co-pending U.S. patent application Ser. No. 09/703,316. As shown in FIG. 6, with more particularity, the JVM AOS 200 includes three subsystem components, each of which encompasses one or more separate threads of control. These subsystems include: the runtime measurements subsystem 202, a controller 242, and a recompilation subsystem 272. In addition to these subsystem components, an AOS database 260 is included to provide a repository that records component decisions and allows components to query these decisions.

With more particularity, the runtime measurements subsystem 202 gathers information about the executing methods in the manner as described herein, summarizes the information, and then either passes the summary information along to the controller 242 via an organizer event queue 220 and/or, records the information in the AOS database.

FIG. 6 illustrates the structure of the runtime measurements subsystem 202. Several systems, including instrumentation in the executing code, hardware performance monitors and VM instrumentation 205, produce raw profiling data 206 as the program runs. Additionally, information is gathered by sampling program execution using techniques such as those described in commonly-owned, co-pending U.S. patent application Ser. No. 09/703,527. This sampling produces raw profiling data, which is typically collected in buffers 206. After sufficient raw data has been collected in a buffer, separate threads called organizers 215 periodically process and analyze the raw data and, packages the data into a suitable format 221 for input to the controller. Thus, it is understood that the generation of raw profiling data is separated from the data analysis for two reasons: 1) it allows multiple organizers 215 to process the same raw data, possibly in different ways; 2) this separation allows low-level profiling code to execute under strict resource constraints. This is because not only just application code may be monitored, but also system services of the VM. So, for example, low-level code that monitors the VM memory allocator must not allocate any objects (it must use pre-allocated data structures and buffers) and should complete its task in a short time period.

Controller

The controller 242 is the brains of the adaptive optimization system 200. With respect to FIG. 6, the controller 242 initiates all runtime measurement subsystem profiling activity by determining what profiling should occur, under what conditions, and for how long. It receives information from the runtime measurement subsystem 202 and AOS database 260, and uses this information to make compilation decisions. It passes these compilation decisions to the recompilation subsystem, directing the actions of the various compilers.

Based on information from the runtime measurements subsystem and the AOS database, the controller may perform the following actions: 1) it can instruct the runtime measurements subsystem to continue or change its profiling strategy, which could include using the recompilation subsystem to insert intrusive profiling; and, 2) it may recompile one or more methods using profiling data to improve their performance. The controller essentially makes, these decisions based on an analytic model representing the costs and benefits of performing these tasks.

More specifically, the controller communicates with the other two subsystems using priority queues: it extracts measurement events from the organizer event queues 220 that is filled by the runtime measurements subsystem and inserts recompilation decisions into a compilation queue 250 that compilation threads 255 process. When these queues are empty, the dequeuing thread(s) sleep. The various system components also communicate indirectly by reading and writing information in the AOS database 260.

A controller thread is created when the JVM is started. It subsequently creates threads corresponding to the other subsystems: organizer threads to perform runtime measurements and compilation threads to perform recompilation.

Recompilation Subsystem

As shown in FIG. 6, the recompilation subsystem consists of compilation threads 255 that invoke compilers 110. The compilation threads extract and execute compilation plans that are inserted into the compilation queue 250 by the controller 242. Recompilation occurs in separate threads from the application, and thus, may occur in parallel.

Each compilation plan consists of three components: an optimization plan, profiling data, and an instrumentation plan.

The optimization plan specifies which optimizations the compiler should apply during recompilation. The profiling data, initially gathered by the runtime measurements subsystem, directs the optimizing compiler's feedback-directed optimizations.

Instrumentation plans dictate which, if any, intrusive instrumentation the compiler should insert into the generated code.

For instance, the controller communicates to the recompilation subsystem 272 any value- or control flow-based information reported by the runtime measurements system. To implement a measurement plan, the controller may also direct the compiler to insert instrumentation to obtain fine-grain profiling information of the method. The recompilation subsystem takes the output of the compiler, a JAVA object that represents the executable code and associated runtime information (exception table information and garbage collection maps), and installs it in the JVM 101, so that all future calls to this method will use a new version.

AOS Database

The AOS database provides a repository where the adaptive optimization system records decisions, events, and static analysis results. The various adaptive system components query these artifacts as needed.

For example, the controller uses the AOS database to record compilation plans and to track the status and history of methods selected for recompilation. The compilation threads also record the time taken to execute each compilation plan in the database. The data on previous compilation plans executed for a method may then be queried by the controller to provide some of the inputs to the recompilation model.

As another example, the compilation threads record static analysis and inlining summaries produced by the optimizing compiler. The controller and organizer threads query this information as needed to guide recompilation decisions. One important use of this information in a preferred implementation is to detect when a previously optimized method should be considered for further optimization because the current profiling data indicates an opportunity for new inlining opportunities that were missed when the method was originally optimized.

Sampling

There is now described two types of information that are obtained by sampling the call stack. This information may be used to characterized a program's execution which may then be used in an adaptive optimization system to improve the executing program's performance. The two types of information that are sampled are a method, the last application method that was executing before the sample was taken; and the last two application methods that were executing before the sample is taken and the address of the return address from the callee to the caller. The pair of methods and the return address represent an edge in the application's call graph.

When a sample is taken, the sampled information is placed in a raw data buffer. In the adaptive optimization system described in greater detail in herein incorporated co-pending U.S. patent application Ser. No. 09/703,316, an organizer thread periodically processes the raw data to allow the controller to consider what methods to tell the recompilation subsystem to recompile and help the optimizing compile determine how to optimize a method. The organizer processes the raw data buffer to generate a list of items that appear in the buffer and weights each list member with how many times it appears in the raw data buffer.

When the type of information sampled is simply a method, the organizer places the methods with the highest weight in an organizer event queue 220, and notifies the controller. The controller uses the list from the organizer queue to determine what methods to optimize since the methods with the highest weight have a high probability of being the methods where most of the execution time is spent.

When the type of information sampled is an edge in the application's call graph, the organizer places the edges with the highest weight in an AOS Database 260. The optimizing compiler queries this information in the AOS database to make inlining decisions. The controller queries this information in the AOS Database to determine if methods that have already been optimized should be reoptimized because of new inlining opportunities that if taken may improve the method's performance. In other words, a method may have been optimized before inlining opportunities were realized.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for characterizing runtime behavior of a computer program executing in an execution environment, said method comprising:
   a) generating a call stack runtime data structure for tracking methods currently active in an executing program thread, an active method on said call stack is represented by a frame;
   b) determining condition for sampling an executing program to determine current program behavior;
   c) upon determination of a sampling condition, said sampling includes examining at least one frame in said call stack in response to evaluate the context of one or more methods represented in the call stack, said at least one frame in said call stack providing context relating to an executing program's calling structure; and,
   d) limiting the number of frames traversed on said call stack runtime data structure in a current sampling operation.

2. The method as claimed in claim 1, further comprising the step of: for each frame of a program thread, maintaining stack pointer for pointing to a previous stack frame associated with the stack frame of the calling method and maintaining pointer to a last stack frame created in a specific executing program thread.

3. The method as claimed in claim 2, wherein said examining step c) includes the step of obtaining said pointer to a stack frame in that specific executing program thread and following previous stack pointers for traversing a path comprising a sequence of edges through previous stack frames from said stack frame, whereby more program context is ascertained as more stack frames are traversed to identify a new sampled path.

4. The method as claimed in claim 3, wherein said examination step c) further includes the step of: setting a flag bit associated with each frame in said call stack runtime data structure whose context has been evaluated by said sampling, said limiting step including preventing further traversal of frames in said call stack runtime data structure upon reaching a frame with a set flag bit.

5. The method as claimed in claim 4, further comprising the step of: maintaining a data structure for representing calling relations among methods of a program thread whenever a sample is taken, said data structure comprising nodes and connecting edges with said nodes representing methods and said edge representing a tuple including a called method and a caller method.

6. The method as claimed in claim 5, wherein after a new sample is taken, the step of: updating said data structure whenever a new sampled path is identified.

7. The method as claimed in claim 6, wherein said data structure is a calling context tree, said updating step comprises the steps of:
   identifying, an ancestor stack frame, $SF_{ancestor}$, by traversing the call stack runtime data structure from a method represented as a stack frame in the call stack, $SF_{last}$, said $SF_{ancestor}$ having its flag bit set on;
   identifying a corresponding node, $N_{ancestor}$, in said context calling tree data structure;
   recursively following parent pointers in the calling context tree starting at a last method $N_{last}$ pointed to in said calling context tree data structure until identifying a node $N_{ancestor}$ whose method corresponds to the method represented by $SF_{ancestor}$; and,
   splicing a portion of the call stack runtime data structure that has just been traversed from $SF_{ancestor}$ into the calling context tree data structure at node $N_{ancestor}$, said splicing includes setting a pointer P to $N_{ancestor}$ and simulating a call for each stack frame that is encountered as the call stack is traversed from $SF_{ancestor}$ to $SF_{last}$.

8. The method as claimed in claim 6, wherein during said traversal of said call stack runtime data structure, if a stack frame is not encountered with its bit turned on, then said method further includes the step of omitting said splicing step, and representing the sampled path as a new root in said calling context tree structure.

9. The method as claimed in claim 7, wherein after splicing the new sampled path into said data structure, the step of updating P to the node in said calling context tree data structure that corresponds to $SF_{last}$.

10. The method as claimed in claim 7, wherein an edge in said data structure further includes a stack frame return address.

11. The method as claimed in claim 7, wherein each said edge has an associated weight representing an execution frequency of said edge.

12. The method as claimed in claim 11, further comprising the steps of:
   ascertaining if a sampled edge is represented in said data structure; and,
   if said sampled edge is represented in said data structure; the step of: incrementing a weight of a corresponding edge in a data structure; and otherwise, adding new corresponding edge in said data structure and setting said edge to one.

13. The method as claimed in claim 6, wherein during said traversal of said call stack runtime data structure, if a stack frame is not encountered with its bit turned on, then said method further includes the step of identifying any node that represents a method 'm' in said in calling context tree structure as $N_{ancestor}$.

14. The method as claimed in claim 6, wherein during said traversal of said call stack runtime data structure, if a stack frame is not encountered with its bit turned on, then said method further includes the step of identifying a node n from a set of nodes representing a method 'm' in said calling context tree structure as $N_{ancestor}$ that has the longest subpath starting at n that is in common with the subpath starting at a $k^{th}$ stack frame in the sampled path.

15. The method as claimed in claim 5, wherein an edge in said data structure further includes a stack frame return address.

16. The method as claimed in claim 5, wherein each said edge has an associated weight representing an execution frequency of said edge.

17. The method as claimed in claim 16, further comprising the steps of:
   ascertaining if a sampled edge is represented in said data structure; and,
   if said sampled edge is represented in said data structure; the step of: incrementing a weight of a corresponding edge in a data structure; and otherwise, adding new corresponding edge in said data structure and setting said edge to one.

18. The method as claimed in claim 1, wherein the the number of frames traversed on said call stack runtime data structure in a current sampling operation is limited to an arbitrary value 'k'.

19. A computer program product comprising a computer readable medium having recorded thereon a computer program which, when loaded in a computer, configures a computer for characterizing runtime behavior of a computer program executing in an execution environment, said computer program executing method steps comprising:
   a) generating a call stack runtime data structure for tracking methods currently active in an executing program thread, an active method on said call stack is represented by a frame;
   b) determining condition for sampling an executing program to determine current program behavior;
   c) upon determination of a sampling condition, said sampling includes examining at least one frame in said call stack in response to evaluate the context of one or more methods represented in the call stack, said at least one frame in said call stack providing context relating to an executing program's calling structure; and
   d) limiting the number of frames traversed on said call stack runtime data structure in a current sampling operation.

20. The computer program product as claimed in claim 19, wherein said method steps further comprises the step of: for each frame of a program thread, maintaining stack pointer for pointing to a previous stack frame associated with the stack frame of the calling method and maintaining pointer to a last stack frame created in a specific executing program thread.

21. The computer program product as claimed in claim 20, wherein said examining step c) includes the step of obtaining said pointer to a stack frame in that specific executing program thread and following previous stack pointers for traversing a path comprising a sequence of edges through previous stack frames from said stack frame, whereby more program context is ascertained as more stack frames are traversed to identify a new sampled path.

22. The computer program product as claimed in claim 21, wherein said examination step c) further includes the step of: setting a flag bit associated with each frame in said call stack runtime data structure whose context has been evaluated by said sampling, said limiting step including preventing further traversal of frames in said call stack runtime data structure upon reaching a frame with a set flag bit.

23. The computer program product as claimed in claim 22, further comprising the step of: maintaining a data structure for representing calling relations among methods of a program thread whenever a sample is taken, said data structure comprising nodes and connecting edges with said nodes representing methods and said edge representing a tuple including a called method and a caller method.

24. The computer program product as claimed in claim 23, wherein after a new sample is taken, the step of: updating said data structure whenever a new sampled path is identified.

25. The computer program product as claimed in claim 23, wherein an edge in said data structure further includes a stack frame return address.

26. The computer program product as claimed in claim 23, wherein each said edge has an associated weight representing an execution frequency of said edge.

27. The computer program product as claimed in claim 26, wherein said method steps further comprise the steps of:
ascertaining if a sampled edge is represented in said data structure; and,
if said sampled edge is represented in said data structure; the step of: incrementing a weight of a corresponding edge in a data structure; and otherwise, adding new corresponding edge in said data structure and setting said edge to one.

28. The computer program product as claimed in claim 23, wherein said data structure is a calling context tree, said updating step comprises the steps of:
identifying, an ancestor stack frame, $SF_{ancestor}$ by traversing the call stack runtime data structure from a method represented as a stack frame in the call stack, $SF_{last}$, said $SF_{ancestor}$, having its flag bit set on;
identifying a corresponding node, $N_{ancestor}$, in said context calling tree data structure;
recursively following parent pointers in the calling context tree starting at a last method $N_{last}$ pointed to in said calling context tree data structure until identifying a node $N_{ancestor}$ whose method corresponds to the method represented by $SF_{ancestor}$; and,
splicing a portion of the call stack runtime data structure that has just been traversed from $SF_{ancestor}$ into the calling context tree data structure at node $N_{ancestor}$, said splicing includes setting a pointer P to $N_{ancestor}$ and simulating a call for each stack frame that is encountered as the call stack is traversed from $SF_{ancestor}$ to $SF_{last}$.

29. The computer program product as claimed in claim 28, wherein after splicing the new sampled path into said data structure, the step of updating P to the node in said call-context tree data structure that corresponds to $SF_{last}$.

30. The computer program product as claimed in claim 28, wherein an edge in said data structure further includes a stack frame return address.

31. The computer program product as claimed in claim 28, wherein each said edge has an associated weight representing an execution frequency of said edge.

32. The computer program product as claimed in claim 31, wherein said method steps further comprise the steps of:
ascertaining if a sampled edge is represented in said data structure; and,
if said sampled edge is represented in said data structure; the step of: incrementing a weight of a corresponding edge in a data structure; and otherwise, adding new corresponding edge in said data structure and setting said edge to one.

33. The computer program product as claimed in claim 28, wherein during said traversal of said call stack runtime data structure, if a stack frame is not encountered with its bit turned on, then said method further includes the step of omitting said splicing step, and representing the sampled path as a new root in said calling context tree structure.

34. The computer program product as claimed in claim 28, wherein during said traversal of said call stack runtime data structure, if a stack frame is not encountered with its bit turned on, then said method further includes the step of identifying any node that represents a method 'm' in said in calling context tree structure as $N_{ancestor}$.

35. The computer program product as claimed in claim 28, wherein during said traversal of said call stack runtime data structure, if a stack frame is not encountered with its bit turned on, then said method further includes the step of identifying a node n from a set of nodes representing a method 'm' in said calling context tree structure as $H_{ancestor}$ that has the longest subpath starting at n that is in common with the subpath starting at a $k^{th}$ stack frame in the sampled path.

36. The computer program product as claimed in claim 19, wherein the number of frames traversed on said call stack runtime data structure in a current sampling operation is limited to an arbitrary value 'k'.

* * * * *